United States Patent
Kinnunen et al.

(10) Patent No.: US 7,272,142 B2
(45) Date of Patent: *Sep. 18, 2007

(54) LEG-WIDE CONNECTION ADMISSION CONTROL

(75) Inventors: Matti Kinnunen, Helsinki (FI);
Kristiina Hietanen, Helsinki (FI);
Maunu Holma, Helsinki (FI); Heikki Ahola, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1008 days.

This patent is subject to a terminal disclaimer.

(21) Appl. No.: 10/167,762

(22) Filed: Jun. 11, 2002

(65) Prior Publication Data
US 2003/0026264 A1    Feb. 6, 2003

Related U.S. Application Data

(63) Continuation of application No. PCT/EP99/10027, filed on Dec. 16, 1999.

(51) Int. Cl.
*H04L 12/28* (2006.01)
(52) U.S. Cl. ............... 370/395.2; 370/395.64
(58) Field of Classification Search ............ None
See application file for complete search history.

(56) References Cited

U.S. PATENT DOCUMENTS

| | | | |
|---|---|---|---|
| 5,539,884 A | | 7/1996 | Robrock, II |
| 6,034,950 A | | 3/2000 | Sauer et al. |
| 6,233,223 B1 | * | 5/2001 | Sabry et al. ............ 370/230 |
| 6,317,438 B1 | * | 11/2001 | Trebes, Jr. ............ 370/466 |
| 6,396,836 B2 | * | 5/2002 | Johnsson ............ 370/395.2 |
| 6,442,147 B1 | * | 8/2002 | Mauger et al. ............ 370/321 |
| 6,563,835 B1 | | 5/2003 | Chen |
| 6,574,221 B1 | | 6/2003 | Petersen |
| 6,597,689 B1 | | 7/2003 | Chiu et al. |
| 6,621,821 B1 | | 9/2003 | Song |

(Continued)

FOREIGN PATENT DOCUMENTS

EP    0679042    10/1995

(Continued)

OTHER PUBLICATIONS

"Applying ATM/AAL2 as a Switching Technology in Third-Generation Mobile Access Networks" by Eneroth, G. et al, IEEE Communications Magazine vol. 37, No. 6, Jun. 1999.

(Continued)

*Primary Examiner*—Duc Ho
(74) *Attorney, Agent, or Firm*—Alfred A. Fressola; Ware, Fressola, Van Der Sluys & Adolphson LLP

(57) ABSTRACT

A switching method and a switching apparatus in a telecommunication network for connecting physical endpoints via a through switch connection, wherein the through switch connection is composed of legs and a leg connector, and a leg is composed of services and subconnections between the services. A leg being terminated by termination points and comprising specific services is formed by leg control means, and the specific services and subconnections between the specific services which form the leg are provided by connection control means, the services being terminated by termination points. Further, connection admission control means accept connections being part of the through switch connection.

9 Claims, 3 Drawing Sheets

U.S. PATENT DOCUMENTS

| | | |
|---|---|---|
| 6,928,069 B2 | 8/2005 | Nakanishi |
| 6,961,340 B2 | 11/2005 | Karlsson et al. |
| 2002/0080788 A1 | 6/2002 | Cheon Lee |
| 2002/0122426 A1 | 9/2002 | Lindquist et al. |
| 2002/0146013 A1 | 10/2002 | Karlsson et al. |
| 2002/0154646 A1 | 10/2002 | Dubois et al. |
| 2004/0202149 A1 | 10/2004 | Karlsson et al. |

FOREIGN PATENT DOCUMENTS

| | | |
|---|---|---|
| EP | 0765582 | 4/1997 |
| WO | WO9620448 | 7/1996 |

OTHER PUBLICATIONS

"Service and Traffic Management for IBCN", K. Geihs et al; IBM Systems Journal, vol. 31, No. 4, 1992.

"Resource Sharing Techniques for ATM Virutal Networking"; H. Tan et al; Global Telecommunications Conference, New York, IEEE 1997; pp. 838-844.

"Intelligent Network Architecture for Broadband ISDN with Layered Call Model", M. Wakamoto et al, Proceedings of the XIV International Switching Symposium, Japan, Oct. 25-30, 1992, pp. 112-116.

"Modeling an ATM-Based Access Network for $3^{rd}$ Generation Mobile Communication Networks", Boldt et al, IEEE, pp. 2590-2593, 1998.

* cited by examiner

LEG-WIDE CONNECTION ADMISSION CONTROL

CROSS-REFERENCE TO RELATED APPLICATION

This application is a continuation of International Application PCT/EP99/10027 having an international filing date of Dec. 16, 1999 and from which priority is claimed under all applicable sections of Title 35 of the United States Code including, but not limited to, Sections 120, 363 and 365(c).

FIELD OF THE INVENTION

The present invention relates to a switching apparatus and method in a telecommunication network for connecting physical endpoints via a through switch connection. In particular, the present invention relates to the cooperation between leg control, connection control, connection admission control and hardware for providing connection admission control for ATM adaptation layer 2 connections in an Asynchronous Transfer Mode (ATM) network element.

BACKGROUND OF THE INVENTION

A through switch connection in an ATM network element or ATM switch in a telecommunication network is composed of legs and a leg connector. The through switch connection means all the connections and resources between physical endpoints at external interfaces. A leg control feature is required to manage necessary connections for incoming and outgoing calls of the through switch connection. Typically, a leg consists of several services and subconnections between them. The legs are connected by a leg connector.

The services are provided by an ATM adaptation layer 2 (AAL2) connection control, and the subconnections are handled by an ATM connection control. Conventionally, leg control and connection control (AAL2 connection control and ATM connection control) provide each leg consisting of AAL2 services and subconnections in several parts. Furthermore, the services and subconnections have to be accepted by a connection admission control. The accepting process is also done in pieces. According to FIG. 1, the leg control asks the control comprising the ATM connection control and the AAL2 connection control to establish the services and subconnections. The ATM connection control and the AAL2 connection control in turn ask the connection admission control for acceptance for the services and subconnections.

However, this conventional way of providing connection admission control is ineffective since many messages have to be exchanged in order to accept each connection being part of a leg. Moreover, when connection admission control accepts for example an AAL2 connection, this does not mean that the other connections forming the leg are acceptable by the connection admission control. Thus, the conventional connection admission procedure is both ineffective and conceptually difficult.

SUMMARY OF THE INVENTION

It is an object of the present invention to improve connection admission control of a leg consisting of a plurality of services and subconnections between the services.

According to one aspect of the present invention, this object is achieved by a switching apparatus in a telecommunication network for connecting physical endpoints via a through switch connection. The through switch connection is composed of legs and a leg connector, and a leg is composed of services and subconnections between the services. The switching apparatus comprises leg control means for forming a leg being terminated by termination points and comprising specific services, and connection control means for providing the specific services and subconnections between the specific services which form the leg, the services being terminated by termination points. In addition, the apparatus comprises connection admission control means for accepting connections being part of the through switch connection. According to the switching apparatus of the present invention, the leg control means ask the connection control means for the termination points of the specific services which form the leg, and then the leg control means ask the connection admission control means for acceptance of the leg on the basis of the leg termination points and the termination points obtained from the connection control means.

The features of the switching apparatus according to the present invention may be provided in an ATM network element.

Furthermore, the services provided in the ATM network element may comprise AAL2 switching services, macro diversity combining services and transcoding services, and the subconnections may be ATM cross-connections.

Moreover, the connection control means may provide ATM connection control and AAL2 connection control.

According to another aspect of the present invention, the above-mentioned object is achieved by a switching method in a telecommunication network for connecting physical endpoints via a through switch connection. The through switch connection is composed of legs and a leg connector, and a leg is composed of services and subconnections between the services. According to the switching method of the present invention, a leg being terminated by termination points and comprising specific services is formed by providing the specific services and subconnections between the specific services, the services being terminated by termination points. Then, the termination points of the specific services which form the leg are obtained, and, finally, the leg is accepted on the basis of the leg termination points and the obtained service termination points.

The switching method according to the present invention may be provided for ATM adaptation layer 2 connections in an ATM network element.

According to the present invention, connection establishment is performed both faster and conceptually clearer than in the conventional method. The present invention eliminates the disadvantages of the conventional connection admission control by reducing the number of messages upon accepting a leg of a through switch connection and by making the leg more natural for the connection admission control.

In the following the present invention will be described by way of a preferred embodiment thereof with reference to the accompanying drawings.

DESCRIPTION OF THE PREFERRED EMBODIMENT

The idea of the present invention is to provide connection admission control for a whole leg of a through switch connection in an ATM switch.

In the following, a preferred embodiment of the present invention will be described by referring to FIGS. 2 to 4.

Figure 2:
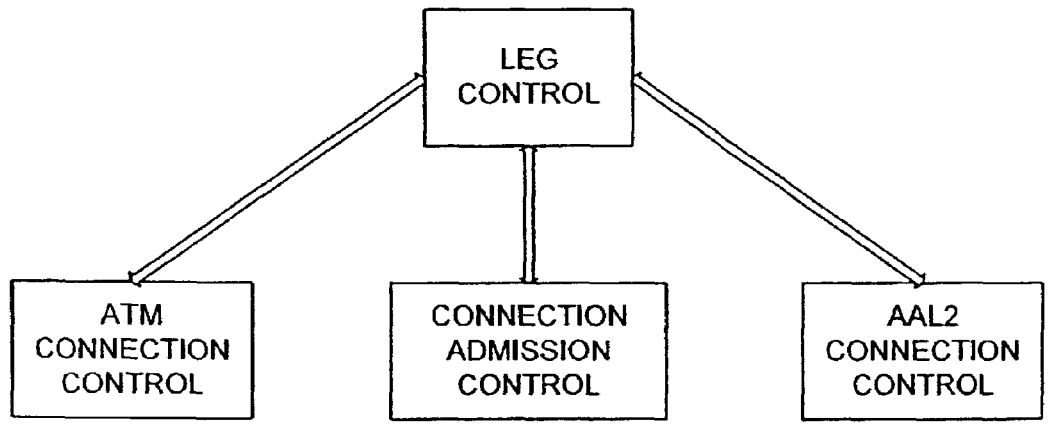
FIG. 2 shows a schematic block diagram of basic components of a switching apparatus according to the present invention.

FIG. 2 shows a schematic block diagram of basic components of a switching apparatus like an ATM switch according to the present invention. As shown in FIG. 2, the ATM switch comprises a leg control, a connection control formed of an ATM connection control and an AAL2 connection control and a connection admission control. The ATM switch connects physical endpoints via a through switch connection. The through switch connection is composed of services and subconnections between the services. In the ATM switch, the leg control forms a leg being terminated by termination points and comprising specific services. The connection control provides the specific services and subconnections between the specific services which form the leg, the services being terminated by termination points. The connection admission control accepts connections being part of the through switch connection. According to the ATM switch of the present invention, the leg control asks the connection control for the termination points of the specific services which form the leg, and then the leg control asks the connection admission control for acceptance of the leg on the basis of the leg termination points and the termination points obtained from the connection control.

Figure 3:
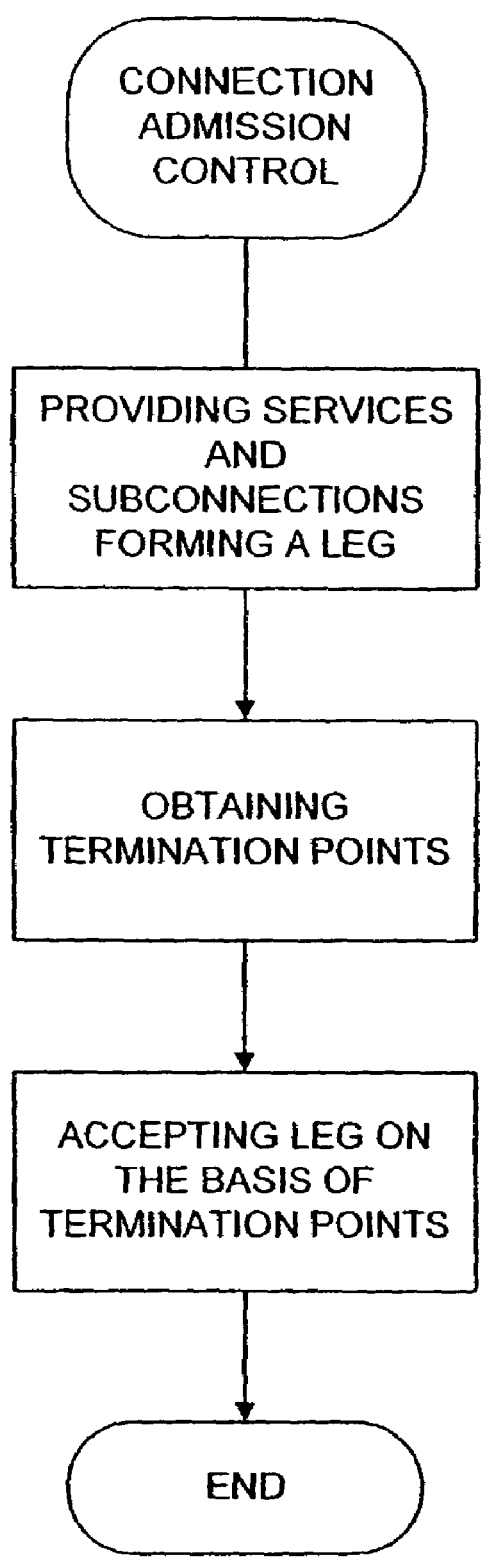
FIG. 3 shows a flowchart of the basic steps performed by a switching method according to the present invention.

FIG. 3 shows a flowchart of the basic steps performed by a switching method of the present invention which for example is provided for ATM adaptation layer 2 connections in an ATM switch. The switching method provides connection admission control comprising the steps as shown in FIG. 3. In a first step in FIG. 3, a leg which is terminated by termination points and comprises specific features is formed by providing the specific services and subconnection between the specific services, the services being terminated by termination points. In a next step in FIG. 3, the termination points of the specific services which form the leg are obtained by the leg control shown in FIG. 2. Finally the leg is accepted on the basis of the leg termination points and the obtained service termination points by the connection admission control which is asked by the leg control for acceptance of the whole leg on the basis of these termination points.

Figure 4:
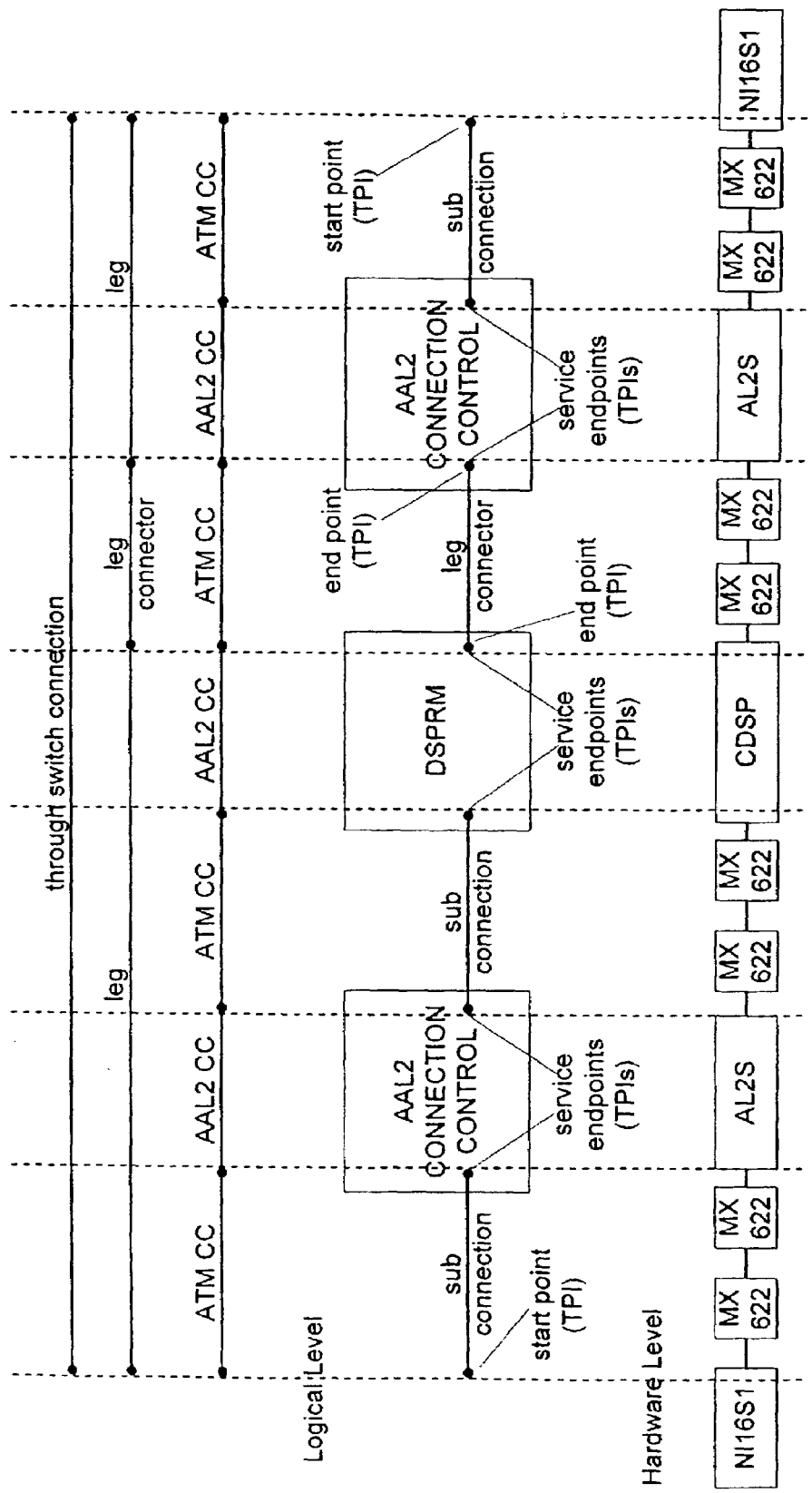
FIG. 4 shows a diagram illustrating a through switch connection according to an embodiment of the present invention.

FIG. 4 shows a through switch connection in an ATM switch according to an embodiment of the present invention.

A through switch connection means all the connections and resources between physical endpoints at external interfaces. The through switch connection is composed of legs and one leg connector. Leg control manages necessary connections for the incoming and outgoing side of a call. A typical leg consists of services and subconnections between the services. As shown in FIG. 4, the leg has a start point (termination point) and an end point (termination point), which are identified by Termination Point Identifiers (TPIs). The leg is identified by the start point, which is unambiguous inside the ATM network element. The start point is used in leg operations to specify a correct leg.

Furthermore, the services forming the leg have termination points. A termination point is a physical point at an internal or external interface. The termination point is identified with the TPI. The termination points are the entities which are connected with subconnections. The subconnection is an ATM cross-connection between two termination points with equal traffic parameters. The subconnections are handled by ATM connection control.

A service is handled in a certain computer unit, for example in a transcoding unit, AAL2 switching unit or a Macro Diversity Combining (MDC) unit, and the connection has to be guided through this unit. The service has one or two termination points. The leg control requires a service from AAL2 connection control which is responsible of reserving the needed termination points. The service is added to the leg by making subconnections to the termination points of the service. The traffic parameters in termination points of a service can be different, i.e. the service can affect bandwidth of the traffic, for example.

According to FIG. 4, a leg starts at a start point which is a termination point identified by a TPI. According to this embodiment, the start point is placed in NI16S1 which is a Network Interface Unit (NIU) forming an external interface. The leg passes from the NIU through an MX622 interface, an SF05 unit (not shown), and another MX622 interface to a Plug-in unit for AAL2 Switching (AL2S). This is one ATM cross-connection forming a subconnection between the start point of the leg and the AAL2 switching service.

The leg continues out of the AL2S unit through the MX622 interface, an SF05 unit (not shown) and another MX622 interface to a Plug-in unit for Configurable Dynamic Signal Processing (CDSP). This is a further ATM cross-connection forming a subconnection between the AAL2 switching service and a Macro Diversity Combining service according to DSPRM (Digital Signal Processing Resource Manager). The leg ends at an end point (termination point) in CDSP.

Thus, the leg consists of four connections: an ATM cross-connection (ATM CC) from the start point to the AAL2 switching service, an AAL2 cross-connection (AAL2 CC) inside the AL2S, a further ATM cross-connection between AL2S and CDSP, and an AAL2 cross-connection inside the CDSP. The other leg shown in FIG. 4 contains only an AAL2 switching service and consists of one ATM cross-connection and one AAL2 cross-connection. The legs are connected by a leg connector. Upon forming the leg, the leg control asks the connection control comprising the ATM connection control and the AAL2 connection control for the termination points of the connections which make up the leg (first and second steps in FIG. 3).

When the leg control has obtained all the termination points from the connection control, it asks the connection admission control for acceptance of the whole leg (third step in FIG. 3). Thereupon, the connection admission control decides whether the ATM switch can accommodate the whole leg.

Figure 1:
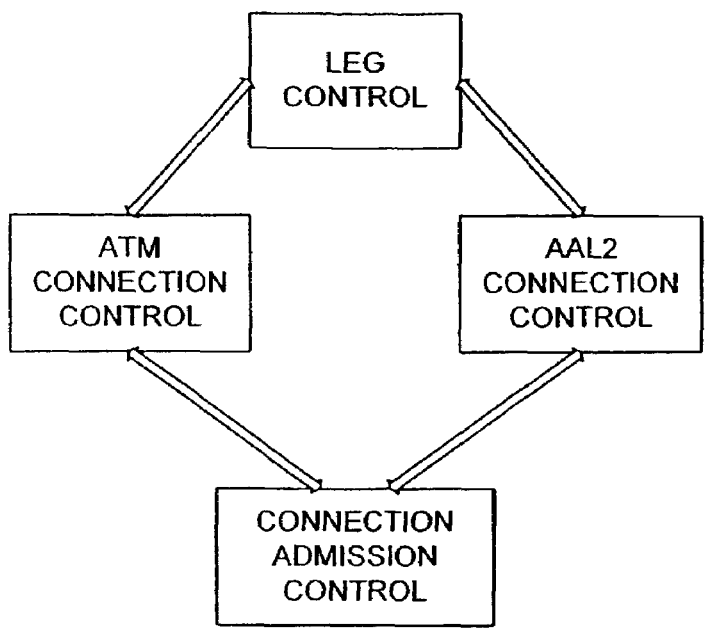
FIG. 1 shows a schematic block diagram of a conventional connection admission control.

According to the present invention and as shown in FIG. 2, the leg control asks the connection admission control for acceptance of the whole leg on the basis of the termination points present in the leg. Thus, the connection control does not have to ask the connection admission control for acceptance for each separate connection forming the leg as shown in FIG. 1 describing the prior art. Therefore, the number of messages (one call to connection admission control instead of four calls) is reduced.

In case the connection admission control according to the present invention finds out that it cannot accept the connection from NI16S1 to AL2S after the leg control has asked the connection control for all the termination points required for the whole leg, the leg control and the connection control must undo the already provided services and subconnections forming the leg. However, since in a running switch rejection of a connection is much rarer than acceptance, the connection admission control is superior to the conventional method.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising:
a leg controller for forming a leg being terminated by termination points in a telecommunications network and comprising specific services, the leg being composed of services and subconnections between the services;
a connection controller for providing the specific services and subconnections between the specific services which form the leg, the services being terminated by termination points; and
a connection admission controller for accepting subconnections being part of a through switch connection;
the leg controller configured to ask the connection controller for the termination points of the specific services which form the leg;
the leg controller configured to ask the connection admission controller for acceptance of the leg on the basis of the leg termination points and the termination points obtained from the connection controller, and
the leg controller configured so that one call to the connection admission controller is used for acceptance of the whole leg.

2. The apparatus according to claim 1, wherein the apparatus is an asynchronous transfer mode network element.

3. The apparatus according to claim 2, wherein the services comprise asynchronous transfer mode adaptation layer 2 switching services, macro diversity combining services and transcoding services.

4. The apparatus according to claim 2, wherein the subconnections are asynchronous transfer mode cross-connections.

5. The apparatus according to claim 2, wherein the connection controller provides asynchronous transfer mode connection control and asynchronous transfer mode adaptation layer 2 connection control.

6. A method comprising:
connecting physical endpoints via a through switch connection, the through switch connection being composed of legs and a leg connector, a leg being composed of services and subconnections between the services,
forming a leg being terminated by termination points and comprising specific services, by providing the specific services and subconnections between the specific services, the services being terminated by termination points;
obtaining the termination points of the specific services which form the leg; and
accepting the leg on the basis of the leg termination points and the obtained service termination points using one call from a leg controller to a connection admission controller.

7. The method according to claim 6, wherein the method is provided for asynchronous transfer mode adaptation layer 2 connections in an asynchronous transfer mode network element.

8. An apparatus comprising:
means for forming a leg being terminated by termination points in a telecommunications network and comprising specific services, the leg being composed of services and subconnections between the services;
means for providing the specific services and subconnections between the specific services which form the leg, the services being terminated by termination points; and
means for accepting subconnections being part of a through switch connection;
the means for forming a leg configured to ask the means for providing the specific services and subconnections for the termination points of the specific services which form the leg;
the means for forming a leg configured to ask the means for accepting connections for acceptance of the leg on the basis of the leg termination points and the termination points obtained from the means for providing the specific services and subconnections, and
the means for providing the specific services and subconnections configured so that one call to the means for accepting connections is used for acceptance of the whole call.

9. The apparatus according to claim 8, wherein the apparatus is an asynchronous transfer mode network element.

* * * * *